(12) United States Patent
Williams et al.

(10) Patent No.: US 11,097,649 B2
(45) Date of Patent: Aug. 24, 2021

(54) SELECTIVELY SEALABLE VEHICLE BED PARTITION AND VEHICLE INCORPORATING THE SAME

(71) Applicant: Toyota Motor Engineering & Manufacturing North America, Inc., Plano, TX (US)

(72) Inventors: Paxton S. Williams, Milan, MI (US); Randy Badia, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 335 days.

(21) Appl. No.: 16/377,357

(22) Filed: Apr. 8, 2019

(65) Prior Publication Data

US 2020/0317140 A1   Oct. 8, 2020

(51) Int. Cl.
*B60P 7/08*   (2006.01)
*B60P 7/14*   (2006.01)
*B65D 90/00*   (2006.01)

(52) U.S. Cl.
CPC .......... *B60P 7/14* (2013.01); *B65D 90/0066* (2013.01)

(58) Field of Classification Search
CPC ..... B60P 7/14; B61D 45/006; B65D 90/0066; B62D 33/042; B60R 9/06; B63B 11/02
USPC ........ 410/117–119, 121, 124, 125, 127–129, 410/140, 151; 296/24.4, 24.35, 24.41, 296/37.6, 39.2
See application file for complete search history.

(56) References Cited

U.S. PATENT DOCUMENTS

| 2,700,196 | A |   | 1/1955 | Panhard |
| 3,098,455 | A | * | 7/1963 | McElroy ............. B61D 45/008 410/125 |
| 3,159,884 | A |   | 12/1964 | Hankey |
| 4,049,311 | A | * | 9/1977 | Dietrich .................. B60P 7/14 410/138 |
| 4,366,977 | A | * | 1/1983 | Davis ....................... B60P 7/14 410/129 |
| 7,017,977 | B1 |  | 3/2006 | Kelter |
| 7,273,336 | B2 | * | 9/2007 | Silamianos ............... B60P 7/14 410/129 |

(Continued)

FOREIGN PATENT DOCUMENTS

EP   1852569 A2   7/2007

*Primary Examiner* — Stephen T Gordon
(74) *Attorney, Agent, or Firm* — Christopher G. Darrow; Darrow Mustafa PC

(57) ABSTRACT

The selectively sealable vehicle bed partition comprises a partition body comprising a top edge, a bottom edge, a first end edge extending between the top edge and the bottom edge, an opposed second end edge extending between the top edge and the bottom edge, a first face bounded by the top edge, bottom edge, first end edge, and second end edge, and an opposed second face bounded by the top edge, bottom edge, first end edge, and second end edge; and a selectively inflatable seal comprising an inflation chamber disposed on the partition body, the selectively inflatable seal disposed on and extending along the first end edge, bottom edge, and second end edge, the selectively inflatable seal comprising a selectively openable and closable valve that is configured to receive and retain a gas for inflation of the inflation chamber and release the gas to deflate the inflation chamber.

10 Claims, 3 Drawing Sheets

(56) References Cited

U.S. PATENT DOCUMENTS

| | | | |
|---|---|---|---|
| 7,871,229 B2* | 1/2011 | Haddad | B65D 90/0066 |
| | | | 410/129 |
| 8,555,552 B2 | 10/2013 | Hooton | |
| 8,931,987 B2 | 1/2015 | Hibbard | |
| 2008/0131226 A1* | 6/2008 | Pesson | B60P 7/14 |
| | | | 410/129 |
| 2013/0047519 A1 | 2/2013 | Hooton | |

* cited by examiner

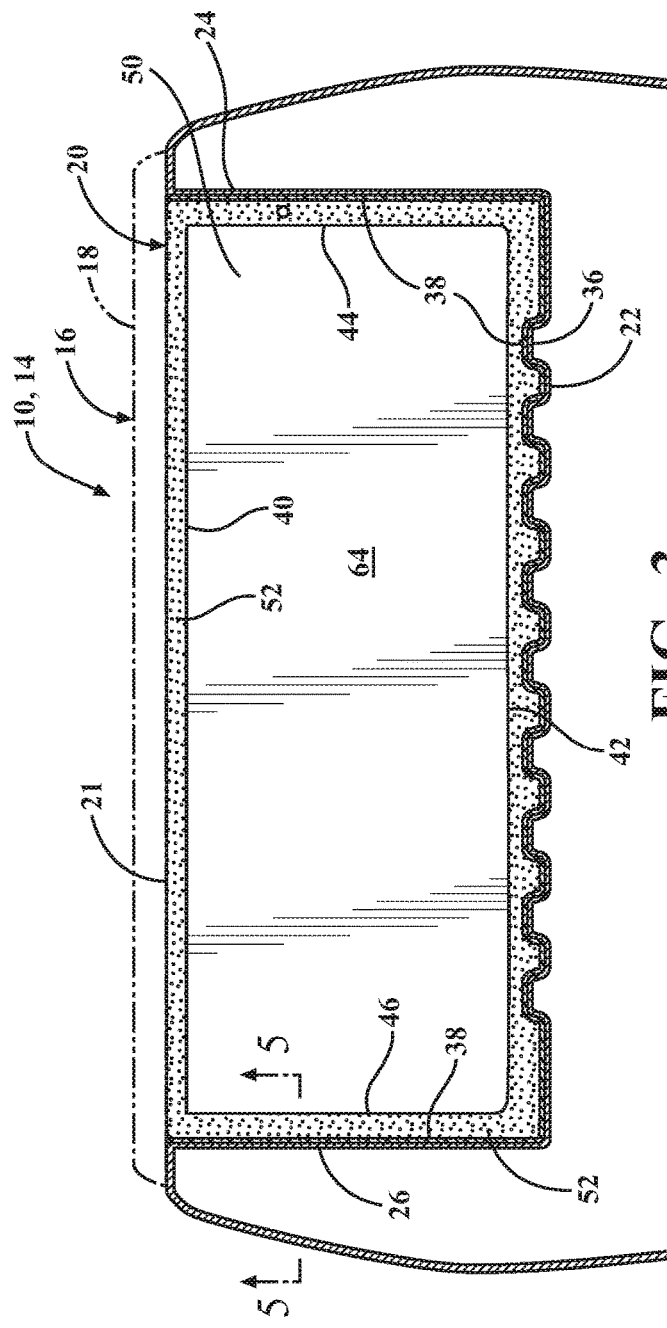
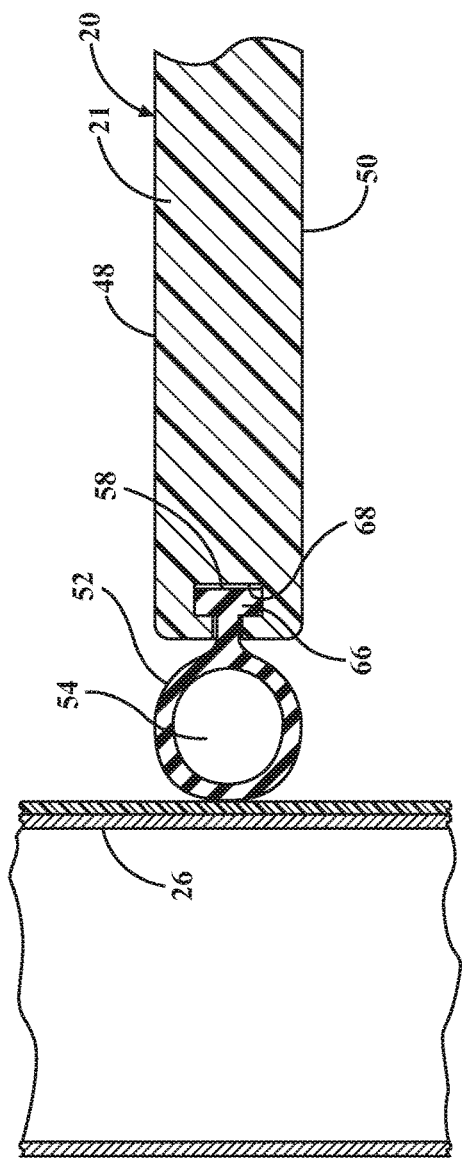

SELECTIVELY SEALABLE VEHICLE BED PARTITION AND VEHICLE INCORPORATING THE SAME

FIELD OF THE INVENTION

The embodiments disclosed herein relate generally to a selectively sealable vehicle bed partition and a vehicle incorporating the same. More particularly, it relates to a selectively sealable truck bed partition and a truck incorporating the same.

BACKGROUND

A number of automotive vehicles, including cars, sport utility vehicles, and light and heavy duty pickup trucks, incorporate vehicle beds, which are sometimes also referred to as vehicle cargo beds, that are defined and partially enclosed by sidewalls. These vehicle beds define a space having a volume bounded by the sidewalls that is used to stow or store and transport a cargo within the vehicle. The vehicle beds are generally in the rear of the vehicle and separated from the passenger compartment either by a fixed sidewall, or by various forms of hinged doors.

The cargoes that are stored in vehicle beds are frequently mixed cargoes that may include a number of different items having different characteristics and properties. In many cases it is desirable to keep these items separated from one another to prevent them from intermingling. For example, the cargo may include wet items and items that are intended to remain dry. In another example, the cargo may include clean items and items that are dirty, where comingling of the items would cause the clean items to become dirty. In yet another example, the cargo may include loose items such as, for example, sand, grain, or mulch that have a tendency to shift within the vehicle bed while the vehicle is in motion, and items that a vehicle operator wishes to keep separated from the loose items. In cases comprising these examples, and in many other cases, it is desirable to further compartmentalize the vehicle bed to keep the items separated or otherwise contained to a specific location within the bed. Separate bins, boxes, bags, and other containers have generally been used for this purpose.

Bed dividers or partitions have been proposed to form compartments in vehicle beds, but they have had features that have limited their usefulness including fixed engagement mechanisms at specific locations within the bed which limit the flexibility of sizing the compartments within the vehicle bed. Further, the floors of the vehicle beds generally include a plurality of raised longitudinally extending ribs that are used to stiffen the vehicle chassis that make it difficult to provide an effective seal for the partitions along the bed floor.

In view of the above, it is desirable to provide vehicle bed partitions or dividers that can be used to provide compartments having a flexible size and that also provide effective sealed separation between compartments, as well as vehicles and vehicle beds that provide these vehicle bed partitions or dividers.

SUMMARY OF THE INVENTION

In one embodiment, a selectively sealable vehicle bed partition is disclosed. The selectively sealable vehicle bed partition comprises a partition body comprising a top edge, a bottom edge, a first end edge extending between the top edge and the bottom edge, an opposed second end edge extending between the top edge and the bottom edge, a first face bounded by the top edge, bottom edge, first end edge, and second end edge, and an opposed second face bounded by the top edge, bottom edge, first end edge, and second end edge. The selectively sealable vehicle bed partition also comprises a selectively inflatable seal comprising an inflation chamber, the selectively inflatable seal disposed on the partition body and extending along the first end edge, bottom edge, and second end edge, the selectively inflatable seal comprising a selectively openable and closable valve that is configured to receive and retain a gas for inflation of the inflation chamber and release the gas to deflate the inflation chamber.

In another embodiment, a vehicle is disclosed. The vehicle comprises a vehicle bed comprising a selectively sealable vehicle bed partition. The selectively sealable vehicle bed partition comprises a partition body comprising a top edge, a bottom edge, a first end edge extending between the top edge and the bottom edge, an opposed second end edge extending between the top edge and the bottom edge, a first face bounded by the top edge, bottom edge, first end edge, and second end edge, and an opposed second face bounded by the top edge, bottom edge, first end edge, and second end edge. The selectively sealable vehicle bed partition also comprises a selectively inflatable seal comprising an inflation chamber, the selectively inflatable seal disposed on and extending along the first end edge, bottom edge, and second end edge, the selectively inflatable seal comprising a selectively openable and closable valve that is configured to receive and retain a gas for inflation of the inflation chamber and release the gas to deflate the inflation chamber.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a cross-sectional view taken along section 3-3 of FIG. 1;

FIG. 5 is a cross-sectional view taken along section 5-5 of FIG. 3.

DESCRIPTION OF THE EMBODIMENTS

Figure 1:
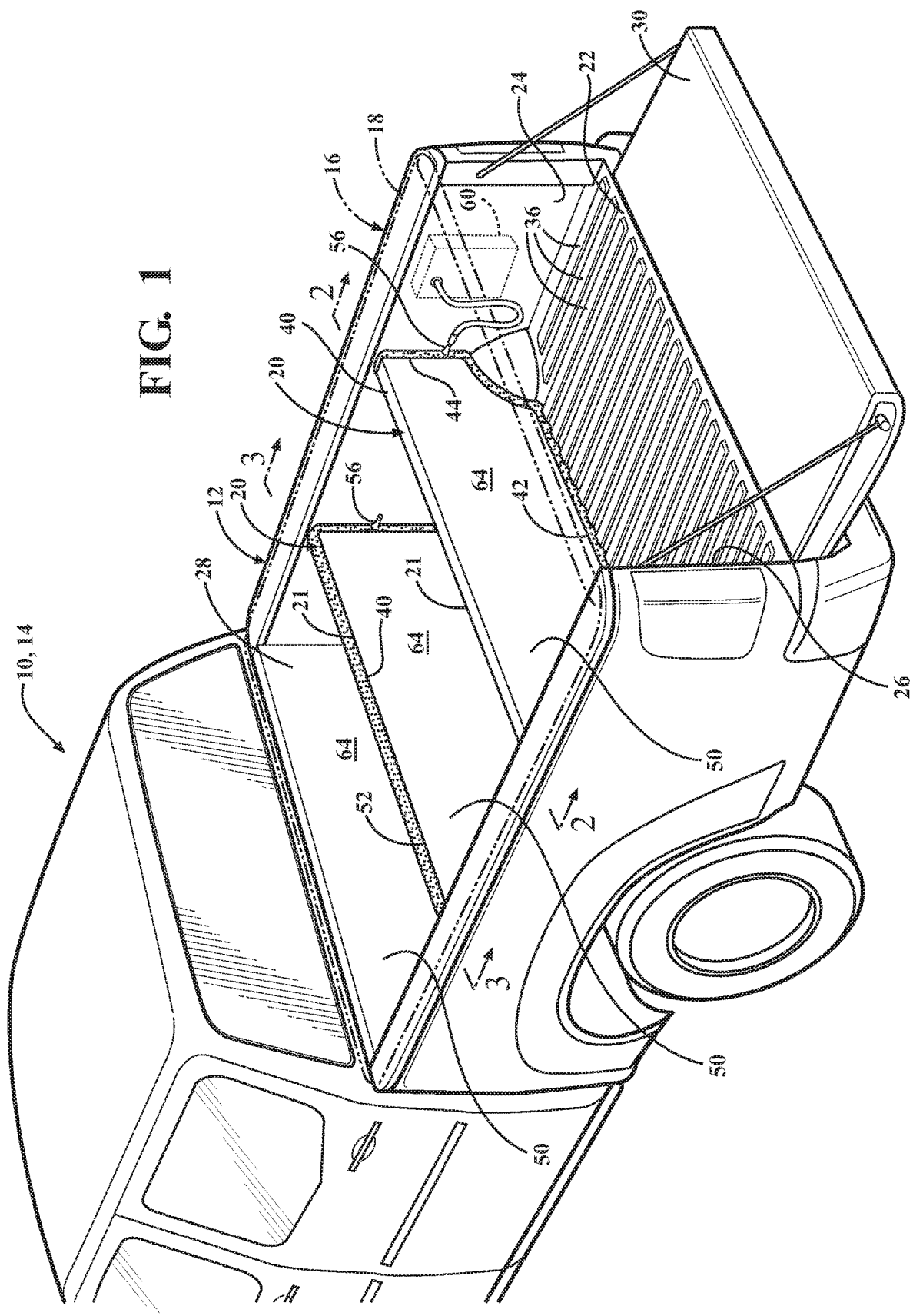
FIG. 1 is a perspective view of an embodiment of a vehicle comprising a vehicle bed that comprises an embodiment of a selectively sealable bed partition and compartments formed therein, all as described herein.

The invention advantageously comprises a selectively sealable vehicle bed partition for use in a vehicle bed of a vehicle. The invention also advantageously comprises a vehicle comprising a vehicle bed that comprises the selectively sealable vehicle bed partition. The selectively sealable vehicle bed partition advantageously overcomes the limitations of related art partitions by providing compartments in the vehicle bed having a flexible size and shape that also provide effective sealed separation between compartments.

The advantages of the selectively sealable vehicle bed partition extend to the vehicles that include them by enhancing the utility of the vehicles, particularly the vehicle beds, by expanding the flexibility of vehicle bed configurations and thus the cargoes that can be simultaneously stowed or stored and transported in the vehicle bed, particularly cargoes with differing characteristics where maintaining separation of the items with different characteristics is a requirement. The selectively sealable vehicle bed partition includes a selectively inflatable seal comprising an inflation chamber to provide sealed separation between compartments, particularly along the floor of the vehicle bed. The selectively inflatable seal comprises an air valve for the selective inflation and deflation of the inflation chamber. The selectively inflatable seal comprising an inflation chamber may also be described as an expandable weather strip bulb that uses compressed air to sealingly fill in gaps around a portion of the periphery of the vehicle bed partition between the partition and the corresponding portions of the vehicle bed. Effective sealing advantageously protects the cargo items put into the vehicle bed from one another without the need for external bins, boxes, bags, or other storage devices. An integral air compressor for the air may be housed on or within a sidewall of the vehicle bed to advantageously provide the compressed air needed to inflate the selectively inflatable seal. A pressure sensor may be included in the compressor to prevent over pressurization and for use to add pressure to maintain continuous or semi-continuous inflation of the selectively inflatable seal in the event any leaks occur. Use of the air valve to deflate the selectively inflatable seal allows the selectively sealable vehicle bed partition to be removed from the vehicle bed enabling a wide variety of bed configurations and rapid transition from one configuration to another.

As used herein, the terms front or forward or rear or rearward or aft refer to the front or rear of the article or vehicle, or to a direction toward the front or rear of the article or vehicle, respectively. The terms longitudinal or along the length refers to a direction that extends along or generally parallel to an article or vehicle centerline between the front and the rear, or from one end to an opposed end. The terms transverse, lateral, or along the width, or left-right refers to a direction that is orthogonal, or substantially orthogonal, to the longitudinal direction. The terms up or upward or down or downward refer to the top or bottom of the article or vehicle, or to a direction substantially toward the top or bottom of the article or vehicle, respectively. The terms in or inner or inward refer to a direction toward the center of the article or vehicle, and out or outer or outward refers to the opposite direction away from the center or central portion of the article or vehicle.

Referring to the Figures, including FIGS. 1-5, this invention comprises a vehicle 10 comprising a vehicle bed 12 with a selectively sealable vehicle bed partition 20 sealably disposed therein. The vehicle 10 may comprise any manner or type of vehicle 10 comprising a vehicle bed 12. In one embodiment, the vehicle 10 comprises an automotive vehicle, such as a car, sport utility vehicle (SUV), or truck, including all manner of light, medium, and heavy-duty pickup trucks 14.

Figure 2:
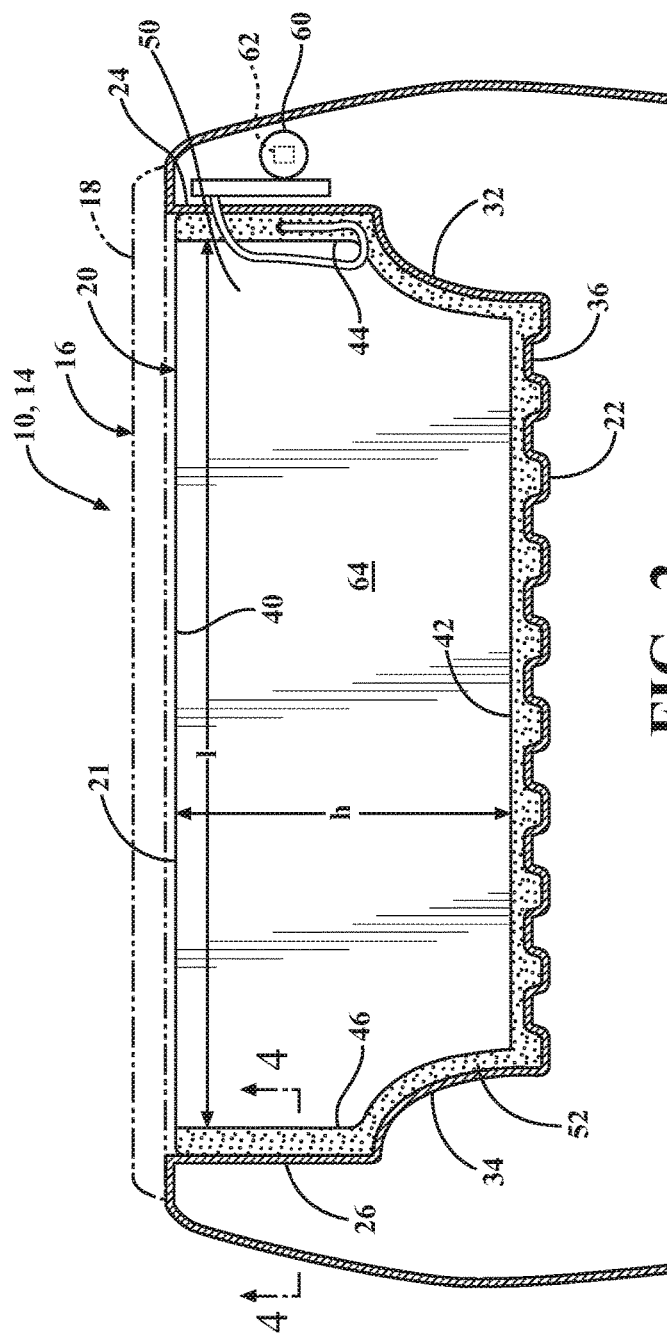
FIG. 2 is a cross-sectional view taken along section 2-2 of FIG. 1.

The vehicle bed 12 may have any suitable shape or size, including long bed or short bed configurations. The vehicle bed 12 may be open as illustrated in FIG. 1 or may have the top partially enclosable or fully enclosable, such as by a cover 16, including a fully removable cover or a partially removable cover, and including all manner of hard covers or soft (e.g. fabric) covers, such as a tonneau cover 18 as shown in phantom in FIGS. 1 and 2, that is configured to cover, either partially or fully, the vehicle bed 12. The vehicle bed 12 is defined by the floor 22, the longitudinally-extending first or right side 24 that extends upwardly generally perpendicular to the floor 22, the longitudinally-extending second or left side 26 that extends upwardly generally perpendicular to the floor 22, laterally-extending front side 28, and selectively pivotable, laterally-extending tailgate 30 that is configured to be raised from the open position and condition shown and placed in selectively lockable and releasable engagement with the longitudinally-extending right side 24 and longitudinally-extending left side 26 in a closed position and condition (not shown) and lowered into the longitudinally-extending open position and condition as shown in FIG. 1. In some embodiments, the vehicle bed 12 also includes an inwardly convexly curved right wheel well 32 and an inwardly convexly curved left wheel well 34 as shown in FIG. 2. The curved right wheel well 32 and the curved left wheel well 34 may comprise separate components attached to the longitudinally-extending right side 24 and longitudinally-extending left side 26, respectively, or may be formed integrally as part of the longitudinally-extending right side 24 and longitudinally-extending left side 26, respectively. The longitudinally-extending right side 24, longitudinally-extending left side 26, laterally-extending front side 28, curved right wheel well 32, and curved left wheel well 34 are attached to one another and to the floor 22 as shown. The floor 22 comprises a plurality of integrally formed, raised, longitudinally-extending ribs 36 that are used to stiffen and strengthen the vehicle 10, particularly the vehicle bed 12 and floor 22. The components of the vehicle bed 12 may be formed from any suitable material, including metals such as various grades and alloys of aluminum and steel, various engineering plastics or polymers, fiber-reinforced composites, and combinations thereof. In certain embodiments, the vehicle bed 12 may also comprise a bed liner 38 that is shown in section in FIG. 3, and which may be formed from an engineering plastic or engineering polymer and disposed on the inward facing surfaces of all or any portion of the floor 22, longitudinally-extending right side 24 including right wheel well 32, longitudinally-extending left side 26 including left wheel well 34, longitudinally-extending front side 28, and laterally-extending tailgate 30.

As shown in FIGS. 1-5, the selectively sealable vehicle bed partition 20 is configured to be sealably disposed in the vehicle bed 12 between and proximate the longitudinally-extending right side 24 and longitudinally-extending left side 26 and along and proximate the floor 22. The selectively sealable vehicle bed partition 20 comprises a partition body 21 that comprises a top edge 40, a bottom edge 42, a first or right end edge 44 extending between the top edge 40 and the bottom edge 42, an opposed second end edge 46 extending between the top edge 40 and the bottom edge 42, a first or front face 48 bounded by the top edge 40, bottom edge 42, first end edge 44, and second end edge 46, and an opposed second or rear face 50 bounded by the top edge 40, bottom edge 42, first end edge 44, and second end edge 46. The partition body 21 may be made from any suitable material, including various metal, engineering plastics or engineering polymers, fiber-reinforced composites, or a combination thereof.

The partition body 21 may have any suitable shape and size, including, in one embodiment, a length (l), a height (h) and a thickness (t). In one embodiment, the selectively sealable vehicle bed partition 20 has a length (l) that is slightly less than the distance between the longitudinally-extending first side 24 and longitudinally-extending second side 26 and configured and sufficient to enable the selectively inflatable seal 52 and inflation chamber 54 to expand into sealing contact with the longitudinally-extending first side 24 and longitudinally-extending second side 26. In one embodiment, the selectively sealable vehicle bed partition 20 has a height (h) that is slightly less than the vertical distance from the floor 22 to the top of the longitudinally-extending first side 24 and longitudinally-extending second side 26 and configured and sufficient to enable the selectively inflatable seal 52 and inflation chamber 54 to expand into sealing contact with the floor. In one embodiment, the thickness (t) may range from 0.5 to 2.5 inches, more particularly from 0.75 to 2.0 inches.

The partition body 21 and selectively sealable vehicle bed partition 20 may have any suitable shape. In one embodiment, the first face 48 and the second face 50 are substantially planar, and more particularly comprise spaced apart parallel planes and comprise a planar partition body. In another embodiment, either or both of the first face 48 and second face 50 are flat planar shape, curved planar shape, or a combination thereof. In one embodiment, the shape of the partition body 21, including the first face 48 and the second face 50, is substantially rectangular or rounded rectangular (FIG. 3). In another embodiment, the shape of the partition body 21, including the first face 48 and the second face 50, is substantially rectangular or rounded rectangular with inwardly concave curved or scalloped cut-outs on the lower corners corresponding to and accommodating the profile of the curved right wheel well 32 and the curved left wheel well 34 (FIG. 2).

Figure 4:
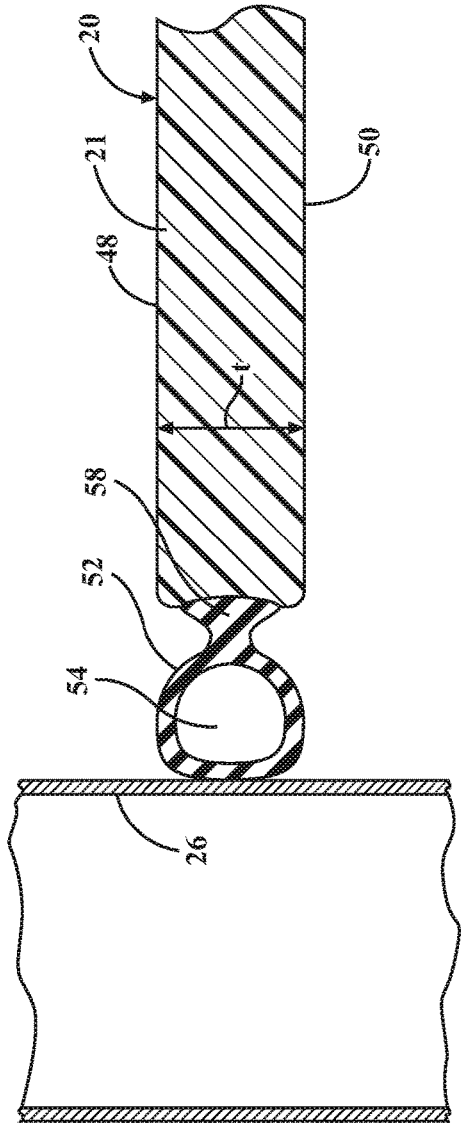
FIG. 4 is a cross-sectional view taken along section 4-4 of FIG. 2.

As shown in FIGS. 1-5, the selectively sealable vehicle bed partition 20 also comprises a selectively inflatable seal 52 comprising an inflation chamber 54. The selectively inflatable seal 52 is disposed on the partition body 21 and extends along and is attached to the first end edge 44, bottom edge 42, and second end edge 46. The selectively inflatable seal 52 comprising the inflation chamber 54 may have any suitable size and shape. In one embodiment, the inflation chamber 54 has a substantially circular cross-section in an inflated and undeformed condition (FIG. 5), and may have a diameter that is the same as corresponding thickness (t) of the partition body 21, as described herein. The selectively inflatable seal 52 also comprises a selectively openable and closable valve 56 that is in fluid communication with and configured to selectively receive and retain a gas, such as compressed air, for inflation of the inflation chamber 54 and selectively release of the gas to deflate the inflation chamber 54. The selectively openable and closable valve 56 may include any suitable valve that is configured to receive a compressed gas, including compressed air, such as, for example, a Schrader valve or Presta valve that is enclosed within a valve stem that is in fluid communication with and attached to or integrally formed with the selectively inflatable seal 52. The selectively inflatable seal 52 may be formed from any suitable elastically deformable material, including all manner of elastomers, such as, for example, various natural or synthetic rubbers. In one embodiment, the selectively inflatable seal 52 comprises a thermoplastic elastomer material that is formed by thermoplastic vulcanization (TPV). The selectively inflatable seal 52 may comprise a base 58 that is attached to or integrally molded directly onto the first end edge 44, bottom edge 42, and second end edge 46 of the partition body 21 as shown in FIG. 4. In another embodiment, the base 58 may comprise a dovetail 66 that is configured to slide into a corresponding dovetail slot 68 formed in the first end edge 44, bottom edge 42, and second end edge 46 of the partition body 21 as shown in FIG. 5. In one embodiment, the inflation chamber 54 comprises a substantially circular cross-section in an inflated condition as shown in FIGS. 4 and 5 that show different degrees of deformation of the respective inflatable seals 52 in the respective inflated conditions of the inflation chambers 54 and the installed positions of the respective selectively sealable vehicle bed partitions 20. In one embodiment, the selectively inflatable seal 52 comprising the inflation chamber 54 is configured to sealingly conform to the floor 22, including the raised, longitudinally-extending ribs 36 in an inflated and deformed condition.

In one embodiment, the selectively sealable vehicle bed partition 20 further comprises the vehicle 10 that comprises the vehicle bed 12, as described herein, comprising the floor 22, longitudinally-extending first side 24 extending upwardly from the floor 22, and an opposed longitudinally extending second side 26 extending upwardly from the floor 22, wherein the partition body 21 is configured for lateral disposition between the longitudinally-extending first side 24 and longitudinally-extending second side 26, and the selectively inflatable seal 52 is configured for sealing engagement with the longitudinally-extending first side 24, longitudinally-extending second side 26, and floor 22 in an installed position of the selectively sealable vehicle bed partition 20 and inflated condition of the selectively inflatable seal 52 as shown, for example, in FIGS. 1, 2, and 4.

In another embodiment, the vehicle 10 comprising the selectively sealable vehicle bed partition 20 also comprises an air compressor 60 disposed on or within one of the floor 22, longitudinally-extending first side 24, or longitudinally-extending second side 26 of the vehicle bed 12 that is configured for attachment to and fluid communication with the selectively openable and closable valve 56 to inflate the inflation chamber 54. The air compressor 60 comprises a pressure sensor 62, wherein the pressure sensor 62 is configured to prevent over pressurization and to maintain a predetermined pressure in the inflation chamber 52. The air compressor 60 may be attached to the selectively openable and closable valve 56 for fluid communication of compressed air in a conventional manner, such as by a flexible rubber air hose as illustrated in FIGS. 1 and 2. The air hose may have any suitable length, including a length sufficient for extension longitudinally and laterally within the vehicle bed 12 to allow placement of the selectively sealable vehicle bed partition 20 within the vehicle bed 12 and inflation of the selectively inflatable seal 52, as described herein.

In another embodiment, the selectively sealable vehicle bed partition 20 comprises a plurality of selectively sealable vehicle bed partitions 20 (FIG. 1), wherein the plurality of selectively sealable vehicle bed partitions 20 are configured for adjustable longitudinally spaced apart lateral disposition between the longitudinally-extending first side 24 and longitudinally-extending second side 26, and wherein the spaced apart selectively inflatable seals 52 are configured for sealing engagement with the longitudinally-extending first side 24, longitudinally-extending second side 26, and floor 22 in an inflated condition. The longitudinally spaced apart selectively sealable vehicle bed partitions 20 in sealing engagement define a plurality of storage compartments 64 within the vehicle bed 12 that are bounded by portions of the vehicle bed 1 2 and/or the selectively sealable vehicle bed partitions 20 and that each comprise and define a predetermined volume configured for stowing or storing and transporting an item or items of cargo in partially sealed separation from one another. As used herein, partially sealed separation means that the items are sealed and separated from one another to the extent of the height (h) of the selectively sealable vehicle bed partitions 20, excepting the upper portions of the storage compartments 64 which may be open to the extent that the cover 16, such as tonneau cover 18, does not touch the adjacent portions of the vehicle bed 12 and selectively sealable vehicle bed partitions 20. In another embodiment, the selectively inflatable seal 52 extends around the entire periphery of the partition body 21, including the top edge 40 and other edges as described herein, and is configured for sealing engagement with the cover 16, thereby providing an additional degree of sealed separation between adjacent storage compartments 64. Any number of the partition bodies 21 and selectively sealable vehicle bed partitions 20 may be installed laterally within the vehicle bed 12 at any of the longitudinal locations within the vehicle bed 12. Thus, the number and size (i.e. volume) of the storage compartments 64 may be selected to be any predetermined number and/or size.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A selectively sealable vehicle bed partition, comprising:
    a partition body made of a rigid material and comprising:
        a top edge, a bottom edge, a first end edge extending between the top edge and the bottom edge, an opposed second end edge extending between the top edge and the bottom edge, a first face bounded by the top edge, the bottom edge, the first end edge, and the opposed second end edge, and an opposed second face bounded by the top edge, the bottom edge, the first end edge, and the opposed second end edge; and
        a dovetail slot formed in the first end edge, the bottom edge, and the opposed second end edge; and
    a selectively inflatable seal comprising:
        a dovetail configured to slide into the dovetail slot so that the selectively inflatable seal is disposed on the partition body;
        an inflation chamber, the selectively inflatable seal disposed on the partition body and extending along the first end edge, the bottom edge, and the opposed second end edge; and
        a selectively openable and closable valve that is configured to receive and retain a gas for inflation of the inflation chamber and release the gas to deflate the inflation chamber.

2. The selectively sealable vehicle bed partition of claim 1, wherein the first face and the opposed second face are substantially planar.

3. The selectively sealable vehicle bed partition of claim 1, wherein the first face and the opposed second face are flat, curved, or a combination thereof.

4. The selectively sealable vehicle bed partition of claim 1, wherein the partition body comprises an engineering polymer, a metal, a fiber-reinforced composite, or a combination thereof.

5. The selectively sealable vehicle bed partition of claim 1, wherein the selectively inflatable seal comprises an elastomer.

6. The selectively sealable vehicle bed partition of claim 1, wherein the inflation chamber comprises a substantially circular cross-section.

7. The selectively sealable vehicle bed partition of claim 1, further comprising a vehicle that comprises a vehicle bed comprising a floor, a longitudinally-extending first side extending upwardly from the floor, and an opposed longitudinally extending second side, the partition body configured for lateral disposition between the longitudinally-extending first side and the opposed longitudinally-extending second side, the selectively inflatable seal configured for a sealing engagement with the longitudinally-extending first side, the opposed longitudinally-extending second side, and the floor in an inflated condition.

8. The selectively sealable vehicle bed partition of claim 7, further comprising an air compressor disposed within one of the floor, the longitudinally-extending first side, or the opposed longitudinally-extending second side, the air compressor configured for fluid communication with the selectively openable and closable valve to inflate the inflation chamber, the air compressor comprising a pressure sensor, the pressure sensor configured to prevent over pressurization and to maintain a predetermined pressure in the inflation chamber.

9. The selectively sealable vehicle bed partition of claim 7, wherein the selectively sealable vehicle bed partition comprises a plurality of longitudinally spaced apart selectively sealable vehicle bed partitions laterally disposed between the longitudinally-extending first side and the opposed longitudinally-extending second side, the plurality of longitudinally spaced apart selectively sealable vehicle bed partitions having a plurality of selectively inflatable seals configured for a sealing engagement with the longitudinally-extending first side, the opposed longitudinally-extending second side, and the floor in an inflated condition, the plurality of longitudinally spaced apart selectively sealable vehicle bed partitions in the sealing engagement defining a storage compartment.

10. The selectively sealable vehicle bed partition of claim 9, further comprising a cover that is configured to cover the vehicle bed and enclose the storage compartment.

* * * * *